United States Patent [19]
Heller et al.

[11] Patent Number: 5,268,233
[45] Date of Patent: Dec. 7, 1993

[54] METHODS OF PREPARING SINTERED SHAPES AND GREEN SHAPES USED THEREIN

[75] Inventors: Fred E. Heller, Uniontown, Ohio; William Higgins, Tucson, Ariz.; Robert E. Quinn, Cleveland, Ohio

[73] Assignee: The Lubrizol Corporation, Wickliffe, Ohio

[21] Appl. No.: 796,158

[22] Filed: Nov. 22, 1991

[51] Int. Cl.$^5$ .............................................. B32B 27/32
[52] U.S. Cl. ................... 428/523; 428/411.1; 252/33.4; 264/44; 264/63; 264/65; 264/66; 501/1; 419/19; 419/30; 419/31; 419/36; 419/37
[58] Field of Search ............................ 428/411.1, 523; 252/33.4; 264/44, 63, 65, 66; 501/1; 419/19, 30, 31, 36, 37

[56] References Cited

U.S. PATENT DOCUMENTS

| | | | |
|---|---|---|---|
| 3,895,127 | 7/1975 | Benedict | 427/39 |
| 4,040,998 | 8/1977 | Nemeth | 106/73.4 |
| 4,448,609 | 5/1984 | Tear et al. | 106/308 |
| 4,654,075 | 3/1987 | Cipollini | 75/0.5 |
| 4,749,664 | 6/1988 | Ross et al. | 501/1 |
| 4,908,338 | 3/1990 | Ross et al. | 501/1 |
| 4,981,602 | 1/1991 | Ripple et al. | 252/33.4 |

OTHER PUBLICATIONS

Dispersion of Ceramic Particles in Organic Liquids Mat. Res. Symp. Proc. vol. 73 (1986).
Materials Resource Society Dispersions of Ceramic Powders in Organic Media, Advances in Ceramics, vol. 21: Ceramic Powder Science Copyright 1987.
The American Ceramic Society, Inc. pp. 411–415 Dispersants in Ceramics Processing British Ceramics Proceedings published by British Ceramics Society vol. 37 (1986) pp. 249–253.
Tape Casting: The Basic Process for Meeting the Needs of the Electronics Industry Ceramic Bulletin, vol. 69, No. 6, 1990 pp. 1022–1026, by R. Mistler.

*Primary Examiner*—John Kight, III
*Assistant Examiner*—Dvc Truong
*Attorney, Agent, or Firm*—Forrest L. Collins; Frederick D. Hunter; David M. Shold

[57] ABSTRACT

The invention relates to a method of preparing sintered shapes, comprising the steps of forming a green body from a mixture comprising (A) a major amount of at least one inorganic powder with (B) at least one reaction product of an amine other than an alkanolamine with a hydrocarbyl-substituted carboxylic acylating agent or alkylalkyleneglycolacetic acylating agent; provided the reaction product is other than an alkylene oxide treated fatty monocarboxylic amide and provided that when the hydrocarbyl-substituted carboxylic acylating agent is a nonaromatic acylating agent, then the hydrocarbyl group is other than hydrocarbyl groups having an average of about 55 to about 110 carbon atoms; and sintering the body. Sintered shapes made from the methods of the present invention have relatively high fired densities and small uniform grain sizes; and low porosity. The reaction products of the present invention help disperse the inorganic powder. These reaction products improve deagglomeration of the inorganic powder and help prevent reagglomeration of the powder.

40 Claims, No Drawings

METHODS OF PREPARING SINTERED SHAPES AND GREEN SHAPES USED THEREIN

CROSS REFERENCE TO RELATED APPLICATION

This application is related to the subject matter of Ser. No. 07/796,495 filed Nov. 22, 1991.

TECHNICAL FIELD

This invention relates to methods for preparing sintered articles.

INTRODUCTION TO THE INVENTION

Methods for the manufacturing of sintered shapes frequently involve the use of additives for controlling the powder/slurry dispersion, rheology, green compaction, density, strength and grain size of the final shape. The objective generally is to achieve the highest possible density with a uniform, small grain size, and in the area of electronic substrates, to achieve an ultra-smooth surface.

Many processes for preparing green shapes involve the preparation and use of slurries prepared by dispersing inorganic powders in liquids including, depending upon the application, water or organic liquids such as xylene, toluene, etc. The slurries of inorganic powders usually are prepared by milling a mixture containing the inorganic powder and the liquid. To improve the dispersion of the solids and maximize the solids concentration in the slurry and minimize slurry viscosity, dispersants have been added to obtain a complete dispersion of the powders in the liquid.

OLOA 1200, available from Chevron Chemical Company, is a succinimide derived from polybutene and is useful as a surfactant, stearic stabilizer, emulsion agent and dispersant in ceramics applications. U.S. Pat. Nos. 3,895,127; 4,654,075; 4,749,664; and 4,908,338 disclose the use of OLOA 1200 in ceramics or glass production. Fowkes in "Ized Dispersions of Ceramic Powders in Organic Media", *Advances in Ceramics*, Volume 21, (1987) describes OLOA 1200 as being useful as a stearic stabilizer in ceramics. Calvert et al in "Dispersion of Ceramic Particles in Organic Liquids", at Material Resource Society Symposium, Volume 73 (1986) Materials Research Society, describes OLOA 1200 as having a chain length of about 60 carbon atoms. Calvert et al in "Dispersants in Ceramic Processing", British Ceramic Proceedings, published by British Ceramic Society, Vol. 37 (1986) describes OLOA 1200 as having a chain length of about 100 carbon atoms.

U.S. Pat. No. 4,040,998 relates to an aqueous dispersion of ceramic slurry. The dispersion is prepared by mixing alumina, phenyl lower alkyl silicone resin and a flux with an alkylolamine detergent in sufficient water to form a dispersion.

SUMMARY OF THE INVENTION

The invention relates to a method of preparing sintered shapes, comprising the steps of forming a shape from a mixture comprising (A) a major amount of at least one inorganic powder with (B) at least one reaction product of an amine other than an alkanolamine with a hydrocarbyl-substituted carboxylic acylating agent or alkylalkyleneglycolacetic acylating agent; provided the reaction product is other than an alkylene oxide treated fatty monocarboxylic amide and provided that when the hydrocarbyl-substituted carboxylic acylating agent is a nonaromatic acylating agent, then the hydrocarbyl group is other than hydrocarbyl groups having an average of about 55 to about 110 carbon atoms; and sintering the shape.

Sintered shapes made by the methods of the present invention have relatively high fired densities, small uniform grain sizes, and low porosity. The reaction products of the present invention help disperse the inorganic powder. These reaction products improve deagglomeration of the inorganic powder and help prevent reagglomeration of the powder. These reaction products are useful as dispersants, binders, lubricants, and emulsifiers in ceramics processing.

DESCRIPTION OF THE PREFERRED EMBODIMENTS

The term "hydrocarbyl" includes hydrocarbon, as well as substantially hydrocarbon, groups. Substantially hydrocarbon describes groups which contain non-hydrocarbon substituents which do not alter the predominately hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkylmercapto, nitro, nitroso, sulfoxy, etc.);

(3) hereto substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. Therefore, the hydrocarbyl group is purely hydrocarbon.

Unless otherwise indicated, molecular weight is determined by gel permeation chromatography and carbon number is determined from number average molecular weight.

(A) INORGANIC POWDERS

Inorganic powders (A) used in the present invention include metallic and non-metallic powders. Powders may also be oxides or non-oxides of metallic or non-metallic elements. An example of metallic elements which may be present in the inorganic powders include calcium, magnesium, barium, scandium, titanium, vanadium, chromium, manganese, iron, cobalt, nickel, copper, zinc, yttrium, niobium, molybdenum, ruthenium, rhodium, silver, cadmium, lanthanum, actinium, gold or combinations of two or more thereof. In one embodiment, the inorganic powder may contain rare earth or ferromagnetic elements. The rare earth elements include the lanthanide elements having atomic numbers from 57 to 71, inclusive and the element yttrium, atomic number 49. Ferromagnetic metals, for purposes of this invention, include iron, nickel, cobalt and numerous alloys containing one or more of these metals. In another embodiment, the metals are present as alloys of two or more of the aforementioned elements. In particular, prealloyed powders such as low alloy steel, bronze, brass and stainless steel as well as nickel-cobalt based super alloys may be used as inorganic powders.

The inorganic powders (A) may comprise inorganic compounds of one or more of the above-described metals. The inorganic compounds include ferrites, titanates, nitrides, carbides, borides, fluorides, sulfides, hydroxides and oxides of the above elements. Specific examples of the oxide powders include, in addition to the oxides of the above-identified metals, compounds such as beryllium oxide, magnesium oxide, calcium oxide, strontium oxide, barium oxide, lanthanum oxide, gallium oxide, indium oxide, selenium oxide, etc. Specific examples of oxides containing more than one metal, generally called double oxides, include perovskite-type oxides such as $NaNbO_3$, $SrZrO_3$, $PbZrO_3$, $SrTiO_3$, $BaZrO_3$, $BaTiO_3$; spinel-type oxides such as $MgAl_2O_4$, $ZnAl_2O_4$, $CoAl_2O_4$, $NiAl_2O_4$, $NiCr_2O_4$, $FeCr_2O_4$, $MgFe_2O_4$, $ZnFe_2O_4$, etc.; illmenite-types oxides such as $MgTiO_3$, $MnTiO_3$, $FeTiO_3$, $CoTiO_3$, $ZnTiO_3$, $LiTaO_3$, etc.; and garnet-type oxides such as $Gd_3Ga_5O_{12}$ and rare earth-iron garnet represented by $Y_3Fe_5O_{12}$.

An example of non-oxide powders include carbides, nitrides, borides and sulfides of the metals described above. Specific examples of the carbides include SiC, TiC, WC, TaC, HfC, ZrC, AlC; examples of nitrides include $Si_3N_4$, AlN, BN and $Ti_3N_4$; and borides include $TiB_2$, $ZrB_2$ and $LaB_6$.

The inorganic powders (A) may also be a clay. Examples of clays include kaolinite, nacrite, dickite, montmorillonite, nontronite, spaponite, hectorite, etc.

In one embodiment, the inorganic powder is silicon nitride, silicon carbide, zirconia, alumina, aluminum nitride, barium ferrite, barium-strontium ferrite or copper oxide. In another embodiment, the inorganic powder is alumina or clay.

(B) REACTION PRODUCTS OF AMINES AND CARBOXYLIC ACYLATING AGENTS

The methods of the present invention use, in addition to the above-described inorganic powder, at least one reaction product of (B) an amine other than an alkanolamine with a hydrocarbyl-substituted carboxylic acylating agent or an alkylalkyleneglycolacetic acylating agent provided the reaction product is other than an alkylene oxide treated fatty monocarboxylic amide and provided that the hydrocarbyl group is other than hydrocarbyl groups having an average of about 55 to about 110 carbon atoms. The reaction products are included in the method the present invention to assist in preparing green bodies and sintered shapes. The presence of the reaction product in the composition facilitates the processing of the powders and provides for increased solids loadings. Green bodies made by the present invention have improved green density, and reduced shrinkage. It is also possible to prepare slurries of inorganic powders in organic liquids containing high solids contents when the slurries contain at least one reaction product of the present invention. Generally, these slurries may contain greater than about 50%, preferably greater than about 60% or greater than about 70% by weight inorganic powder, based on the weight of the slurry.

The amount of the reaction product of the present invention included in the methods of the present invention may be varied over a wide range depending upon the nature of the solid particles, the reaction product, and materials used to form the green body. Generally, the methods use from about 0.05%, preferably from about 0.1%, more preferably from about 0.2% to about 30%, preferably to about 15%, more preferably to about 10% by weight of the reaction product, based on the weight of inorganic powder in the composition. In another embodiment, the methods use from about 0.5% to about 15% by weight of the reaction product based on the weight of the inorganic powder, and in some cases, the compositions may contain as little as 0.2% to about 5% by weight of the reaction product based on the weight of the inorganic powder.

The amines may be a mono- or polyamine, including amine condensates, alkoxylated alkylenepolyamines, and heterocyclic polyamines.

The monoamines generally contain from 1 to about 24 carbon atoms, preferably 1 to about 12, and more preferably 1 to about 6. Examples of monoamines useful in the present invention include methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc. Tertiary amines include trimethylamine, tributylamine, methyldiethylamine, ethyldibutylamine, etc.

The amine may also be a polyamine. The polyamine may be aliphatic, cycloaliphatic, heterocyclic or aromatic. Examples of the polyamines include alkylenepolyamines, arylpolyamines, and heterocyclic polyamines.

Alkylenepolyamines are represented by the formula

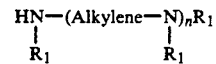

wherein n has an average value between about 1 and about 10, preferably about 2 to about 7, more preferably about 2 to about 5, and the "Alkylene" group has from 1 to about 10 carbon atoms, preferably about 2 to about 6, more preferably about 2 to about 4. $R_1$ is independently preferably hydrogen or an aliphatic group of up to about 30 carbon atoms. In one embodiment, each $R_1$ is independently hydrogen or a hydrocarbyl group of one, preferably two to about eight carbon atoms. Examples of $R_1$ include hydrogen, methyl, ethyl, propyl, hexyl and octyl groups.

Such alkylenepolyamines include methylenepolyamines, ethylenepolyamines, butylenepolyamines, propylenepolyamines, pentylenepolyamines, etc. The higher homologs and related heterocyclic amines such as piperazines and N-amino alkyl-substituted piperazines are also included. Specific examples of such polyamines are ethylenediamine, triethylenetetramine, tris-(2aminoethyl)amine, propylenediamine, trimethylenediamine, tripropylenetetramine, tetraethylenepentamine, hexaethyleneheptamine, pentaethylenehexamine, etc.

Higher homologs obtained by condensing two or more of the above-noted alkylene amines are similarly useful as are mixtures of two or more of the afore-described polyamines.

Ethylenepolyamines, such as some of those mentioned above, are useful. Such polyamines are described in detail under the heading Ethyleneamines in Kirk Othmer's "Encyclopedia of Chemical Technology", 2d Edition, Vol. 7, pages 22-37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylenepolyamines including cyclic condensation products such as the afore-described piperazines. Ethylenepolyamine mixtures are useful.

Other useful types of polyamine mixtures are those resulting from stripping of the above-described polyamine mixtures to leave as residue what is often termed "polyamine bottoms". In general, alkylenepolyamine bottoms can be characterized as having less than two, usually less than 1% (by weight) material boiling below about 200° C. A typical sample of such ethylenepolyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably diethylenetriamine), 0.72% triethylenetetraamine, 21.74% tetraethylenepentamine and 76.61% pentaethylenehexamine and higher (by weight). These alkylenepolyamine bottoms include cyclic condensation products such as piperazine and higher analogs of diethylenetriamine, triethylenetetramine and the like.

Another useful polyamine is a condensation reaction between at least one hydroxy compound with at least one polyamine reactant containing at least one primary or secondary amino group. The hydroxy compounds are preferably polyhydric alcohols and amines. The polyhydric alcohols such as alkylene polyols. Preferably, the polyhydric alcohols contain from 2 to about 40 carbon atoms, more preferably 2 to about 20; and from 2 to about 10 hydroxyl groups, more preferably 2 to about 6. Polyhydric alcohols include ethylene glycols, including di-, tri- and tetraethylene glycols; propylene glycols, including di-, tri- and tetrapropylene glycols; glycerol; butanediol; hexanediol; sorbitol; arabitol; mannitol; sucrose; fructose; glucose; cyclohexanediol; erythritol; and pentaerythritols, including di- and tripentaerythritol; preferably, diethylene glycol, triethylene glycol, glycerol, sorbitol, pentaerythritol and dipentaerythritol. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric amines include tri-(hydroxypropyl)amine, tris-(hydroxymethyl)amino methane, 2-amino-2-methyl-1,3-propanediol, N,N,N',N'-tetrakis(2-hydroxypropyl)ethylenediamine, and N,N,N',N'-tetrakis(2-hydroxyethyl)ethylenediamine, preferably tris(hydroxymethyl)aminomethane (THAM).

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C., (preferably about 220° C. to about 250° C.) in the presence of an acid catalyst.

The amine condensates and methods of making the same are described in PCT publication WO86/05501 which is incorporated by reference for its disclosure to the condensates and methods of making the same. The preparation of such polyamine condensates may occur as follows: A 4-necked 3-liter round-bottomed flask equipped with glass stirrer, thermowell, subsurface $N_2$ inlet, Dean-Stark trap, and Friedrich condenser is charged with: 1299 grams of HPA Taft Amines (amine bottoms available commercially from Union Carbide Co. with typically 34.1% by weight nitrogen and a nitrogen distribution of 12.3% by weight primary amine, 14.4% by weight secondary amine and 7.4% by weight tertiary amine), and 727 grams of 40% aqueous tris(hydroxymethyl)aminomethane (THAM). This mixture is heated to 60° C. and 23 grams of 85% $H_3PO_4$ is added. The mixture is then heated to 120° C. over 0.6 hour. With $N_2$ sweeping, the mixture is then heated to 150° C. over 1.25 hour, then to 235° C. over 1 hour more, then held at 230°-235° C. for 5 hours, then heated to 240° C. over 0.75 hour, and then held at 240°-245° C. for 5 hours. The product is cooled to 150° C. and filtered through diatomaceous earth. Yield: 84% (1221 grams).

In another embodiment, the amine may be a heterocyclic polyamine. The heterocyclic polyamines include aziridines, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine.

One or more of the above amines is reacted with a hydrocarbyl-substituted carboxylic acylating agent or an alkylalkyleneglycolacetic acylating agent, provided that the hydrocarbyl group is other than hydrocarbyl groups having an average of about 55 to about 110 carbon atoms. The hydrocarbyl-substituted carboxylic acylating agent may be a monocarboxylic or polycarboxylic acylating agent. The acylating agents may be a carboxylic acid or derivatives of the carboxylic acid such as the halides, esters, anhydrides, etc. In one embodiment, the carboxylic acylating agent is a succinic acylating agent.

In one embodiment, the hydrocarbyl group contains from about 8, preferably from about 10, more preferably from about 12, to about 50, preferably about 40, more preferably about 30, more preferably to about 24 carbon atoms. The hydrocarbyl group may be an alkyl or alkenyl group, which is derived from one or more olefin. These olefins are preferably alpha-olefins (sometimes referred to as mono-1-olefins) or isomerized alpha-olefins. Examples of the alpha-olefins include 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene, etc. Commercially available alpha-olefin fractions that can be used include the $C_{15-18}$alpha-olefins, $C_{12-16}$alpha-olefins, $C_{14-16}$alpha-olefins, $C_{14-18}$alpha-olefins, $C_{16-18}$alpha-olefins, $C_{16-20}$alpha-olefins, $C_{22-28}$alpha-olefins, etc. The $C_{16}$ and $C_{16-18}$alpha-olefins are particularly preferred.

Isomerized alpha-olefins are alpha-olefins that have been converted to internal olefins. The isomerized alpha-olefins suitable for use herein are usually in the form of mixtures of internal olefins with some alpha-olefins present. The procedures for isomerizing alpha-olefins are well known to those in the art. Briefly these procedures involve contacting alpha-olefin with a cation exchange resin at a temperature in a range of about 80° to about 130° C. until the desired degree of isomerization is achieved. These procedures are described for example in U.S. Pat. No. 4,108,889 which is incorporated herein by reference. The succinic acylating agents are prepared by reacting the above-described olefins or isomerized olefins with unsaturated carboxylic acids such as fumaric acids or maleic acid or anhydride at a temperature of about 160° to about 240° C., preferably about 185° to about 210° C. Free radical inhibitors (e.g., t-butyl catechol) can be used to reduce or prevent the formation of polymeric byproducts. The procedures for preparing the acylating agents are well known to those skilled in the art and have been described for example in U.S. Pat. No. 3,412,111; and Ben et al, "The Ene Reaction of Maleic Anhydride With Alkenes", J. C. S. Perkin II (1977), pages 535-537. These references are incorporated by reference for their disclosure of procedures for making the above acylating agents.

In another embodiment, the hydrocarbyl-substituted carboxylic acylating agent may have a hydrocarbyl group derived from a polyalkene. The polyalkene is characterized as containing an average of at least about 110, preferably at least about 120, more preferably at least about 130 carbon atoms. The polyalkene generally contains an average of up to about 500, preferably to about 300, more preferably to about 200 carbon atoms. In one embodiment, the polyalkene is characterized by an $\overline{M}n$ (number average molecular weight) value of at least about 1600. Generally, the polyalkene is characterized by an $\overline{M}n$ value from about 1600, preferably from about 1700, more preferably from about 1800 to about 5000, preferably to about 3000, more preferably to about 2500. Number average molecular weight ($\overline{M}n$) is determined by gel permeation chromatography.

In another embodiment the hydrocarbyl groups are derived from polyalkenes having an $\overline{M}n$ value in the above-described ranges and an $\overline{M}w/\overline{M}n$ value from about 1.5, preferably from about 1.8, more preferably about 2.5 to about 4, preferably to about 3.6, more preferably to about 3.2. The preparation and use of substituted succinic acylating agents wherein the substituent is derived form such polyolefins are described in U.S. Pat. No. 4,234,435, the disclosure of which is hereby incorporated by reference.

The polyalkenes include homopolymers and interpolymers of polymerizable olefin monomers of 2 to about 16 carbon atoms; usually 2 to about 6 carbon atoms. the olefins may be monoolefins such as ethylene, propylene, 1-butene, isobutene, and 1-octene; or a polyolefinic monomer, preferably diolefinic monomer, such 1,3-butadiene and isoprene. Preferably the monomers contain from 2 to about 6 carbon atoms, more preferably 2 to about 4, more preferably 4. The interpolymers include copolymers, terpolymers, tetrapolymers and the like. Preferably, the interpolymer is a homopolymer. An example of a preferred homopolymer is a polybutene, preferably a polybutene in which about 50% of the polymer is derived from isobutylene. The polyalkenes are prepared by conventional procedures.

The hydrocarbyl-substituted acylating agents are prepared by a reaction of one or more polyalkene or olefin with one or more unsaturated carboxylic reactants. The unsaturated carboxylic reactants may contain one or more carboxyl groups, preferably one to about four, more preferably one or two. Examples of unsaturated carboxylic reactants containing one carboxyl group include acrylic, methacrylic or crotonic acids or derivatives thereof. Examples of unsaturated carboxylic reactants having two carboxyl groups include maleic, fumaric, itaconic, citraconic acids and derivatives thereof, preferably maleic or fumaric acids or derivatives thereof.

The hydrocarbyl-substituted acylating agents may be prepared by reacting a polyalkene or an olefin with the unsaturated carboxylic reactant such that there is at least one mole of unsaturated reactant for each mole of polyalkene or olefin. Preferably, an excess of unsaturated carboxylic reactant is used. This excess is generally between about 5% to about 25%.

In another embodiment, the acylating agents are prepared by reacting the above described polyalkene with an excess of maleic anhydride to provide hydrocarbyl-substituted succinic acylating agents wherein the number of succinic groups for each equivalent weight of substituent group is at least 1.3. The maximum number generally will not exceed 4.5. A suitable range is from about 1.4 to about 3.5 and more specifically from about 1.4 to about 2.5 succinic groups per equivalent weight of substituent groups. In this embodiment, the polyalkene preferably has an $\overline{M}n$ from about 1600, preferably about 1700 to about 5000, preferably to about 3000 and a $\overline{M}w/\overline{M}n$ of at least 1.5, as described above. A more preferred range for $\overline{M}n$ is from about 1600 to about 2800, and a most preferred range of $\overline{M}n$ values is from about 1600, preferably about 1700 to about 3000, preferably about 2400.

The conditions, i.e., temperature, agitation, solvents, and the like, for reacting an unsaturated carboxylic reactant with a polyalkene, are known to those in the art. Examples of patents describing various procedures for preparing useful acylating agents include U.S. Pat. Nos. 3,215,707 (Rense); 3,219,666 (Norman et al); 3,231,587 (Rense); 3,912,764 (Palmer); 4,110,349 (Cohen); and 4,234,435 (Meinhardt et al); and U.K. 1,440,219. The disclosures of these patents are hereby incorporated by reference.

In one embodiment, the hydrocarbyl substituted carboxylic acylating agent is a fatty carboxylic acylating agent. Fatty carboxylic acylating agents generally contain from about 8, preferably from about 12 to about 30, preferably to about 24 carbon atoms. The fatty carboxylic acylating agents include fatty acids. Illustrative carboxylic acids include palmitic acid, stearic acid, myristic acid, oleic acid, linoleic acid, behenic acid, hexatriacontanoic acid, tetrapropylene-substituted glutaric acid, octadecyl-substituted adipic acid, chlorostearic acid, 9-methylstearic acid, dichlorostearic acid, stearyl-benzoic acid, eicosane-substituted naphthoic acid, dilauryl-decahydronaphthalene carboxylic acid, mixtures of these acids, their alkali and alkaline earth metal salts, and/or their anhyrides. A preferred group of aliphatic fatty acids includes the saturated and unsaturated higher fatty acids containing from about 12 to about 30 carbon atoms. Illustrative of these acids are lauric acid, palmitic acid, oleic acid, linoleic acid, linolenic acid, oleostearic acid, stearic acid, myristic acid, and undecenoic acid, alpha-chlorostearic acid, and alphanitrolauric acid.

The acylating agent may also be an aromatic carboxylic acid. A group of useful aromatic carboxylic acids are those of the formula

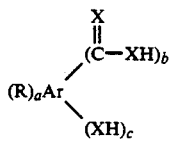

wherein R is a hydrocarbyl group; (a), (b) and (c) are each independently an integer from 1 up to 3 times the number of aromatic nuclei are present Ar with the proviso that the sum of (a) plus (b) plus (c) does not exceed the unsatisfied valencies of Ar; and Ar is independently an aromatic moiety which has from 0 to 3 substituents selected from the group consisting of lower alkyl, alkoxyl, nitro, halo or combinations of two or more thereof. The number of aromatic nuclei, fused, linked or both, in the above-described Ar can play a role in determining the integer values of a, b and c. For example, when Ar contains a single aromatic nucleus, a, b and c are each independently 1 to 4. When Ar contains two aromatic nuclei, a, b and c can each be an integer from 1 to 8, that is, up to three times the number of aromatic nuclei present (in naphthalene, 2). With a tri-nuclear aromatic moiety (Ar), a, b and c can each be an integer of 1 to 12. For instance, when Ar is a biphenyl or a naphthyl moiety, a, b and c can each independently be an integer of 1 to 8. The values of a, b and c are limited by the fact that their sum cannot exceed the total unsatisfied valences of Ar.

The aromatic moiety, Ar, can be a single aromatic nucleus such as a benzene nucleus, a pyridine nucleus, a thiophene nucleus, a 1,2,3,4-tetrahydronaphthalene nucleus, etc., or a polynuclear aromatic moiety. Such polynuclear moieties can be of the fused type; that is, wherein at least two aromatic nuclei are fused at two points to another nucleus such as found in naphthalene, anthracene, the azanaphthalenes, etc. Such polynuclear aromatic moieties also can be of the linked type wherein at least two nuclei (either mono or polynuclear) are linked through bridging linkages to each other. Such bridging linkages can be chosen from the group consisting of carbon-to-carbon single bonds, ether linkages, keto linkages, sulfide linkages, polysulfide linkages of 2 to 6 sulfur atoms, sulfinyl linkages, sulfonyl linkages, methylene linkages, alkylene linkages, di-(lower alkyl)- methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages. In certain instances, more than one bridging linkage can be present in Ar between aromatic nuclei. For example, a fluorene nucleus has two benzene nuclei linked by both a methylene linkage and a covalent bond. Such a nucleus may be considered to have 3 nuclei but only two of them are aromatic. Normally, Ar will contain only carbon atoms in the aromatic nuclei per se.

R is a hydrocarbyl group having from about 8, preferably about 10, more preferably about 12 up to about 500, preferably about 300, more preferably about 200 carbon atoms. In one embodiment, the hydrocarbyl group has a number average molecular weight of about 700, preferably about 800, more preferably about 900 to about 5000, preferably about 3000, more preferably about 2000, more preferably about 1500. In another embodiment, R is derived from a polyalkene having a number average molecular weight from about 700, preferably about 800, more preferably about 900 up to about 1500, preferably about 1200. In another embodiment, R is a hydrocarbyl group as described about with a hydrocarbyl-substituted carboxylic acylating agent.

Within this group of aromatic acids, a useful class of carboxylic acids are those of the formula

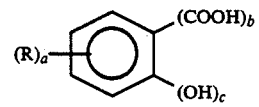

wherein a, b, c and R are defined above, a is a number in the range of from zero to about 4, preferably 1 to about 3; b is a number in the range of 1 to about 4, preferably 1 to about 2, c is a number in the range of zero to about 4, preferably 1 to about 2, and more preferably 1; with the proviso that the sum of a, b and c does not exceed 6. Preferably, b and c are each one and the carboxylic acid is a salicylic acid. The salicylic acids preferably are aliphatic hydrocarbon-substituted salicyclic acids wherein each aliphatic hydrocarbon substituent contains an average of at least about 8 carbon atoms per substituent and 1 to 3 substituents per molecule.

The above aromatic carboxylic acids are well known or can be prepared according to procedures known in the art. Carboxylic acids of the type illustrated by these formulae and processes for preparing their neutral and basic metal salts are well known and disclosed, for example, in U.S. Pat. Nos. 2,197,832; 2,197,835; 2,252,662; 2,252,664; 2,714,092; 3,410,798; and 3,595,791.

In another embodiment, the carboxylic acid is an alkylalkyleneglycol-acetic acid, more preferably alkyl-polyethyleneglycol-acetic acid. Some specific examples of these compounds include: iso-stearylpentaethyleneglycol-acetic acid; iso-stearyl-O—(CH$_2$CH$_2$O)$_5$CH$_2$CO$_2$Na; lauryl-O—(CH$_2$CH$_2$O)$_{2.5}$—CH$_2$CO$_2$H; lauryl-O—(CH$_2$CH$_2$O)$_{3.3}$CH$_2$CO$_2$H; oleyl-O—(CH$_2$C—H$_2$O)$_4$—CH$_2$CO$_2$H; lauryl-O—(CH$_2$CH$_2$O)$_{4.5}$CH$_2$CO$_2$H; lauryl-O—(CH$_2$CH$_2$O)—$_{10}$CH$_2$CO$_2$H; lauryl-O—(CH$_2$CH$_2$O)$_{16}$CH$_2$CO$_2$H; octyl-phenyl-O—(CH$_2$CH$_2$O)$_8$CH$_2$CO$_2$H; octyl-phenyl-O—(CH$_2$C-H$_2$O)$_{19}$CH$_2$CO$_2$H; 2-octyl-decanyl-O—(CH$_2$C-H$_2$O)$_6$CH$_2$CO$_2$H. These acids are available commercially from Sandoz Chemical under the tradename Sandopan acids.

The above reaction products may be post-treated with one or more post-treating reagents selected from the group consisting of boron trioxide, boron anhydrides, boron halides, boron acids, boron amides, esters of boric acids, carbon disulfide, hydrogen sulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds with phenols, and sulfur with phenols.

The following U.S. Patents are expressly incorporated herein by reference for their disclosure of post-treating processes and post-treating reagents: U.S. Pat. Nos. 3,087,936; 3,254,025; 3,256,185; 3,278,550; 3,282,955; 3,284,410; 3,338,832; 3,533,945; 3,639,242; 3,708,522; 3,859,318; 3,865,813; etc. U.K. Patent Nos. 1,085,903 and 1,162,436 also describe such processes.

In one embodiment, the reaction product are post-treated with at least one boron compound. The reaction of the reaction product with the boron compounds can be effected simply by mixing the reactants at the desired temperature. Ordinarily it is preferably between about 50° C. and about 250° C. In some instances it may be 25° C. or even lower. The upper limit of the temperature is the decomposition point of the particular reaction mixture and/or product.

The amount of boron compound reacted with one of reaction product generally is sufficient to provide from about 0.1 to about 10 atomic proportions of boron for each equivalent of the reaction product, such as the atomic proportion of nitrogen or hydroxyl group of the reaction product. The preferred amounts of reactants are such as to provide from about 0.5 to about 2 atomic proportions of boron for each equivalent of reaction product. To illustrate, the amount of a boron compound having one boron atom per molecule to be used with one mole of an amine reaction product having five nitrogen atoms per molecule is within the range from about 0.1 mole to about 50 moles, preferably from about 0.5 mole to about 10 moles.

The following examples relate to carboxylic acylating agents and their reaction with at least one amine. Unless otherwise indicated in the following examples, as well as elsewhere in the specification and claims, all percentages and parts are by weight, temperature is in degrees Celsius and pressure is atmospheric pressure.

EXAMPLE 1

A mixture of 510 parts (0.28 mole) of polybutene ($\overline{Mn}=1845$; $\overline{Mw}=5325$) and 59 parts (0.59 mole) of maleic anhydride is heated to 100° C. This mixture is heated to 190° C. in seven hours during which 43 parts (0.6 mole) of gaseous chlorine is added beneath the surface. At 190°–192° C. an additional 11 parts (0.16 mole) of chlorine is added over 3.5 hours. The reaction mixture is stripped by heating at 190°–193° C. with nitrogen blowing for 10 hours. The residue is the desired polybutene-substituted succinic acylating agent having a saponification equivalent number of 87 as determined by ASTM procedure D-94.

EXAMPLE 2

A mixture of 1,000 parts (0.495 mole) of polybutene ($\overline{Mn}=2020$; $\overline{Mw}=6049$) and 115 parts (1.17 moles) of maleic anhydride is heated to 110° C. This mixture is heated to 184° C. in 6 hours during which 85 parts (1.2 moles) of gaseous chlorine is added beneath the surface. At 184°–189° C. an additional 59 parts (0.83 mole) of chlorine is added over 4 hours. The reaction mixture is stripped by heating at 186°–190° C. with nitrogen blowing for 26 hours. The residue is the desired polybutene-substituted succinic acylating agent having a saponification equivalent number of 87 as determined by ASTM procedure D-94.

EXAMPLE 3

A mixture of 3,251 parts of polybutene chloride, prepared by the addition of 251 parts of gaseous chlorine to 3,000 parts of polybutene ($\overline{Mn}=1696$; $\overline{Mw}=6594$) at 80° C. in 4.66 hours, and 345 parts of maleic anhydride is heated to 200° C. in 0.5 hour. The reaction mixture is held at 200°–224° C. for 6.33 hours, stripped at 210° C. under vacuum and filtered. The filtrate is the desired polybutene-substituted succinic acylating agent having a saponification equivalent number of 94 as determined by ASTM procedure D-94.

EXAMPLE 4

The procedure for Example 1 is repeated except the polybutene ($\overline{Mn}=1845$; $\overline{Mw}=5325$) is replaced on an equimolar basis by polybutene ($\overline{Mn}=2510$; $\overline{Mw}=5793$).

EXAMPLE 5

The procedure for Example 1 is repeated except the polybutene ($\overline{Mn}=1845$; $\overline{Mw}=5325$) is replaced on an equimolar basis by polybutene ($\overline{Mn}=3220$; $\overline{Mw}=5660$).

EXAMPLE 6

A mixture is prepared by the addition of 10.2 parts (0.25 equivalent) of a commercial mixture of ethylene polyamines having from about 3 to about 10 nitrogen atoms per molecule to 113 parts of mineral oil and 161 parts (0.25 equivalent) of the substituted succinic acylating agent prepared in Example 1 at 138° C. The reaction mixture is heated to 150° C. in 2 hours and stripped by blowing with nitrogen. The reaction mixture is filtered to yield the filtrate as an oil solution of the desired product.

EXAMPLE 7

A mixture is prepared by the addition of 57 parts (1.38 equivalents) of a commercial mixture of ethylene polyamines having from about 3 to 10 nitrogen atoms per molecule to 1,067 parts of mineral oil and 893 parts (1.38 equivalents) of the substituted succinic acylating agent prepared in Example 2 at 140° to 145° C. The reaction mixture is heated to 155° C. in 3 hours and stripped by blowing with nitrogen. The reaction mixture is filtered to yield the filtrate as an oil solution of the desired product.

EXAMPLE 8

A mixture is prepared by the addition of 18.2 parts (0.433 equivalent) of a commercial mixture of ethylene polyamines having from about 3 to 10 nitrogen atoms per molecule to 392 parts of mineral oil and 348 parts (0.52 equivalent) of the substituted succinic acylating agent prepared in Example 2 at 140° C. The reaction mixture is heated to 150° C. in 1.8 hours and stripped by blowing with nitrogen. The reaction mixture is filtered to yield the filtrate as an oil solution of the desired product.

EXAMPLES 12–25

Examples 12–25 are prepared by following the general procedure set forth in Example 6.

TABLE I

| Example Number | Succinic Acylating Agent Prepared in: | Reactant(s) | Ratio of Substituted Succinic Acylating Agent To Reactants | Percent Diluent |
|---|---|---|---|---|
| 12 | Example 3 | Pentaethylene hexamine[a] | 1:2 equivalents | 40% |
| 13 | Example 2 | ZnO[b]: polyamines[c] | 1:0.5:0.5 equivalents | 50% |
| 14 | Example 1 | Tris(2-aminoethyl)amine | 2:1 moles | 50% |
| 15 | Example 2 | Imino-bis-propylamine | 2:1 moles | 40% |
| 16 | Example 1 | Hexamethylene diamine | 1:2 moles | 40% |
| 17 | Example 4 | 1-(2-Aminoethyl)-2-methyl-2-imidazoline | 1:1 equivalent | 40% |
| 18 | Example 1 | N-aminopropylpyrrolidone | 1:1 mole | 40% |
| 19 | Example 1 | N,N-dimethyl-1,3-propane diamine | 1:1 equivalent | 40% |
| 20 | Example 1 | Ethylene diamine | 1:4 equivalents | 40% |
| 21 | Example 1 | 1,3-Propane diamine | 1:1 mole | 40% |
| 22 | Example 2 | 2-Pyrrolidinone | 1:1.1 moles | 20% |
| 23 | Example 1 | Urea | 1:0.625 mole | 50% |
| 24 | Example 4 | Diethylenetriamine[c] | 1:1 mole | 50% |
| 25 | Example 5 | Triethylenetetramine[d] | 1:0.5 mole | 50% |

[a] A commercial mixture of ethylene polyamines corresponding in empirical formula to pentaethylene hexamine.
[b] In this example the ZnO is added with water to the polybutene-substituted succinic acylating agent and mineral oil mixture at 78° C., heated at 95° C. for 4 hours and then the preparation is completed according to the general procedure set forth in Example 6.
[c] A commercial mixture of ethylene polyamines corresponding in empirical formula to diethylenetriamine.
[d] A commercial mixture of ethylene polyamines corresponding in empirical formula to triethylenetetramine.

EXAMPLE 9

A vessel is charged with 426 parts of a tetrapropenyl substituted succinic anhydride and 50 parts of xylene. The mixture is heated to 93° C. and 242 parts of the commercial mixture of ethylene polyamines of Example 6 is added dropwise over an hour. The reaction mixture is heated to 149°–160° C. and the reaction temperature is maintained for two hours. The reaction mixture is vacuum-stripped to 150° C. and 10 millimeters of mercury. The residue is cooled to room temperature and is the desired product.

EXAMPLE 10

A product is prepared according to the procedure of Example 9, except a $C_{18-24}$ succinic anhydride is used in place of tetrapropenyl substituted anhydride.

EXAMPLE 11

A product is prepared by the procedure described in Example 9, except hexadecenyl succinic anhydride is used in place of tetrapropenyl substituted anhydride of Example 9.

EXAMPLES 26–32

Examples 26–32 are prepared by following the general procedure set forth in Example 9.

TABLE II

| Example Number | Succinic Acylating Agent of: | Reactants(s) | Ratio of Substituted Succinic Acylating Agent To Reactants |
|---|---|---|---|
| 26 | Example 9 | Pentaethylene hexamine[a] | 1:2 equivalents |
| 27 | Example 10 | Hexamethylene diamine | 1:2 moles |
| 28 | Example 10 | 1,3-Propane diamine | 1:1 moles |
| 29 | Example 11 | Urea | 1:0.63 mole |
| 30 | Example 9 | Diethylenetriamine[c] | 1:1 mole |
| 31 | Example 11 | Triethylenetetramine[d] | 1:0.5 mole |
| 32 | Example 11 | 2-Pyrrolidinone | 1:1.1 moles |

[a] A commercial mixture of ethylene polyamines corresponding in empirical formula to pentaethylene hexamine.
[b] A commercial mixture of ethylene polyamines corresponding in empirical formula to diethylenetriamine.
[c] A commercial mixture of ethylene polyamines corresponding in empirical formula to triethylenetetramine.

ORGANIC BINDER

Binders may be included in the compositions to facilitate the production of green bodies whether the bodies are produced by extrusion or injection molding, press molding or slip casting or other methods.

The amount of binder included in the compositions of the present invention is an amount which provides the desired properties for the green and sintered shapes. Generally, the compositions will contain about 5% by weight of the binder based on the weight of the inorganic powder although larger amounts, such as to about 30% by weight, can be utilized in some applications. The binder may be present in amounts greater than 0.5% by weight of the inorganic powder.

A variety of binders have been suggested and utilized in the prior art and can be utilized in the methods and compositions of the present invention. Examples of these binders include starch, cellulose derivatives, polyvinyl alcohols, polyvinylbutyral, etc. Examples of synthetic resin binders include thermoplastic materials such as polystyrene, polyethylene, polypropylene and mixtures thereof.

Other binders which are useful in the composition of the invention include vegetable oils, petroleum jelly and various wax-type binders which may be hydrocarbon waxes or oxygen-containing hydrocarbon waxes. Examples of hydrocarbon waxes include petroleum waxes such as paraffin wax, microcrystalline wax, petrolatum, etc., synthetic hydrocarbons such as Fischer-Tropsch wax, low molecular weight polyethylene, etc. Examples of oxygen-containing waxes include higher fatty acids and esters and glycerides of the higher fatty acids with a higher alcohol, and oxygen-containing compounds obtained by air-oxidation of normal paraffin or isoparaffin such as alcohols, ketones, carboxylic acids, oxycarboxylic acids, keto carboxylic acids, esters, lactones, etc. The oxygen-containing wax-type binders may be natural waxes and/or synthetic waxes. The natural waxes include animal waxes such as bees wax, whale wax, China wax, wool wax; vegetable waxes such as candelilla wax, carnuba wax, Japan wax, sugarcane wax, etc.; and mineral waxes such as montan wax, ozokerite wax, lignite wax, etc. Examples of synthetic oxygen-containing was-type binders include modified waxes such as montan wax derivatives, paraffin wax derivatives, microcrystalline wax derivatives, etc.; higher monohydric alcohols such as cetyl alcohol, stearyl alcohol, myristyl alcohol, lauryl alcohol, etc.; higher fatty acids such as capric acid, lauric acid, palmitic acid, stearic acid, etc. Mixtures of any of the above waxes also can be utilized as binders in the present invention.

SINTERING AIDS

"Sintering aids" may be organic or inorganic materials which improve properties of the final sintered product. Examples of inorganic materials include the hydroxides, oxides or carbonates of alkali metals, alkaline earth metals, and the transition metals including, in particular, the rare earth elements. Specific examples of inorganic sintering aids include calcium oxide, magnesium oxide, calcium carbonate, magnesium carbonate, zinc oxide, zinc carbonate, yttrium oxide, yttrium carbonate, zirconium oxide, zirconium carbonate, lanthanum oxide, neodymium oxide, samarium oxide, etc.

In another embodiment, the above reaction products (B) may be used together with an overbased or gelled overbased metal salt. This combination of materials reduces mixing time and provides good dispersion properties. The overbased or gelled overbased compounds are useful as sintering aids because they provide metal carbonate which decomposes to metal oxides under sintering conditions. This combination is particularly useful because the reaction product (B) together with the overbased or gelled overbased metal salts are compatible and therefore provide good suspension. This is particularly beneficial for electrical properties of the final sintered shape. Overbased metal salts are characterized by metal content in excess of that which would be present according to stoichiometry of metal in the particular organic compound reacted with the metal.

The amount of excess metal is commonly expressed in metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5. The basic salts of the present invention have a metal ratio from about 1.1, preferably from about 1.5, more preferably from about 3 to about 40, preferably to about 30, more preferably to about 20.

The overbased materials are prepared by reacting an acidic material, typically carbon dioxide, with a mixture comprising an acidic organic compound, a reaction medium comprising at least one inert, an organic solvent for the organic material, a stoichiometric excess of the metal compound, and a promoter. The acidic organic compounds useful in making the overbased compositions of the present invention include carboxylic acids, sulfonic acids, phosphorus acids, phenols or mixtures of two or more thereof. Preferably, the acidic organic compounds are carboxylic acids or sulfonic acids with sulfonic acids more preferred. The carboxylic and sulfonic acids may have substituent groups derived from the above described polyalkenes.

The carboxylic acids may be aliphatic or aromatic, mono- or polycarboxylic acid or acid-producing compounds. These carboxylic acids are described above as carboxylic acylating agents and aromatic acids or derivatives thereof. The acid-producing compounds include anhydrides, lower alkyl esters, acyl halides, lactones and mixtures thereof unless otherwise specifically stated.

The carboxylic acids suitable for use in making the overbased salts are well known in the art and have been described in detail, for example, in the following U.S., British and Canadian patents: U.S. Pat. Nos. 3,024,237; 3,172,892; 3,219,666; 3,245,910; 3,271,310; 3,272,746; 3,278,550; 3,306,907; 3,312,619; 3,341,542; 3,367,943; 3,374,174; 3,381,022; 3,454,607; 3,470,098; 3,630,902; 3,755,169; 3,912,764; and 4,368,133; British Patents 944,136; 1,085,903; 1,162,436; and 1,440,219; and Canadian Patent 956,397. These patents are incorporated herein by reference for their disclosure of carboxylic acids and methods for making the same.

Illustrative carboxylic acids include palmitic acid, stearic acid, myristic acid, oleic acid, linoleic acid, behenic acid, hexatriacontanoic acid, tetrapropylenyl-substituted glutaric acid, polybutenyl ($\overline{M}n=200$–1,500, preferably 300–1,000)-substituted succinic acid, polypropylenyl, ($\overline{M}n=200$–1,000, preferably 300–900)-substituted succinic acid, octadecyl-substituted adipic acid, chlorostearic acid, 9-methylstearic acid, dichlorostearic acid, stearyl-benzoic acid, eicosane-substituted naphthoic acid, dilauryl-decahydronaphthalene carboxylic acid, mixtures of these acids, their alkali and alkaline earth metal salts, and/or their anhydrides. Aliphatic fatty acids include the saturated and unsaturated higher fatty acids containing from about 12 to about 30 carbon atoms. Illustrative of these acids are lauric acid, palmitic acid, oleic acid, linoletic acid, linolenic acid, oleostearic acid, stearic acid, myristic acid, and undecalinic acid, alpha-chlorostearic acid, and alphanitrolauric acid.

In another embodiment, the carboxylic acid is an alkylalkylene glycol-acetic acid, more preferably alkyl-polyethyleneglycol-acetic acid. Some specific examples of these compounds include: iso-stearylpentaethyleneglycolacetic acid; iso-stearyl-O—$(CH_2CH_2O)_5CH_2CO_2Na$; lauryl-O—$(CH_2CH_2O)_{2.5}$—$CH_2CO_2H$; lauryl-O—$(CH_2CH_2O)_{3.3}CH_2CO_2H$; oleyl-O—$(CH_2CH_2O)_4$—$CH_2CO_2H$; lauryl-O—$(CH_2CH_2O)_{4.5}CH_2CO_2H$; lauryl-O—$(CH_2CH_2O)$—$_{10}CH_2CO_2H$; lauryl-O—$(CH_2CH_2O)_{16}CH_2CO_2H$; octyl-phenyl-O—$(CH_2CH_2O)_8CH_2CO_2H$; octyl-phenyl-O—$(CH_2CH_2O)_{19}CH_2CO_2H$; 2-octyl-decanyl-O—$(CH_2CH_2O)_6CH_2CO_2H$. These acids are available commercially from Sandoz Chemical under the tradename Sandopan acids.

The sulfonic acids useful in making the overbased salts include the sulfonic and thiosulfonic acids. Generally they are salts of sulfonic acids. The sulfonic acids include the mono- or polynuclear aromatic or cycloaliphatic compounds. The oil-soluble sulfonates can be represented for the most part by one of the following formulae: $R_7$—T—$(SO_3)_d$ and $R_8$—$(SO_3)_e$, wherein T is a cyclic nucleus such as, for example, benzene, naphthalene, anthracene, diphenylene oxide, diphenylene sulfide, petroleum naphthenes, etc.; $R_7$ is an aliphatic group such as alkyl, alkenyl, alkoxy, alkoxyalkyl, etc.; $(R_7)+T$ contains a total of at least about 15 carbon atoms; $R_8$ is an aliphatic hydrocarbyl group containing at least about 15 carbon atoms and d and e are each independently an integer from 1 to about 3, preferably 1. Examples of $R_8$ are alkyl, alkenyl, alkoxyalkyl, carboalkoxyalkyl, etc. Specific examples of $R_8$ are groups derived from petrolatum, saturated and unsaturated paraffin wax, and the above-described polyalkenes. The groups T, $R_7$, and $R_8$ in the above Formulae can also contain other inorganic or organic substituents in addition to those enumerated above such as, for example, hydroxy, mercapto, halogen, nitro, amino, nitroso, sulfide, disulfide, etc. In the above Formulae, d and e are at least 1.

Illustrative examples of these sulfonic acids include monoeicosane-substituted naphthalene sulfonic acids, dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polybutenyl, having a number average molecular weight ($\overline{Mn}$) in the range of about 500, preferably about 800 to about 5000, preferably about 2000, more preferably about 1500, with chlorosulfonic acid, nitronaphthalene sulfonic acid, paraffin wax sulfonic acid, cetylcyclopentane, sulfonic acid, lauryl-cyclohexane sulfonic acids, polyethylenyl ($\overline{Mn}$=300–1,000, preferably 750) sulfonic acids, etc. Normally the aliphatic groups will be alkyl and/or alkenyl groups such that the total number of aliphatic carbons is at least about 8, preferably at least 12.

A preferred group of sulfonic acids are mono-, di-, and tri-alkylated benzene and naphthalene (including hydrogenated forms thereof) sulfonic acids. Illustrative of synthetically produced alkylated benzene and naphthalene sulfonic acids are those containing alkyl substituents having from about 8 to about 30 carbon atoms, preferably about 12 to about 30 carbon atoms, and advantageously about 24 carbon atoms. Such acids include di-isododecyl-benzene sulfonic acid, polybutenyl-substituted sulfonic acid, polypropylenyl-substituted sulfonic acids of $\overline{Mn}$=300–1000, preferably 500–700, cetylchlorobenzene sulfonic acid, di-cetylnaphthalene sulfonic acid, di-lauryldiphenylether sulfonic acid, diisononylbenzene sulfonic acid, di-isooctadecylbenzene sulfonic acid, stearylnaphthalene sulfonic acid, and the like.

Specific examples of oil-soluble sulfonic acids are mahogany sulfonic acids; bright stock sulfonic acids; sulfonic acids derived from lubricating oil fractions having a Saybolt viscosity from about 100 seconds at 100° F. to about 200 seconds at 210° F.; petrolatum sulfonic acids; mono- and poly-wax-substituted sulfonic and polysulfonic acids of, e.g., benzene, naphthalene, phenol, diphenyl ether, naphthalene disulfide, etc.; other substituted sulfonic acids such as alkyl benzene sulfonic acids (where the alkyl group has at least 8 carbons), cetylphenol mono-sulfide sulfonic acids, dilauryl beta naphthyl sulfonic acids, and alkaryl sulfonic acids such as dodecyl benzene "bottoms" sulfonic acids.

Dodecyl benzene "bottoms" sulfonic acids are the material leftover after the removal of dodecyl benzene sulfonic acids that are used for household detergents. These materials are generally alkylated with higher oligomers. The bottoms may be straight-chain or branched-chain alkylates with a straight-chain dialkylate preferred.

The production of sulfonates from detergent manufactured by-products by reaction with, e.g., $SO_3$, is well known to those skilled in the art. See, for example, the article "Sulfonates" in Kirk-Othmer "Encyclopedia of Chemical Technology", Second Edition, Vol. 19, pp. 291 et seq. published by John Wiley & Sons, New York (1969).

The phosphorus-containing acids useful in making the overbased salts include any phosphorus acids such as phosphoric acid or esters; and thiophosphorus acids or esters, including mono and dithiophosphorus acids or esters. Preferably, the phosphorus acids or esters contain at least one, preferably two, hydrocarbyl groups containing from 1 to about 50 carbon atoms, typically 1, preferably 3, more preferably about 4 to about 30, preferably to about 18, more preferably to about 8.

In one embodiment, the phosphorus-containing acids are dithiophosphoric acids which are readily obtainable by the reaction of phosphorus pentasulfide ($P_2S_5$) and an alcohol or a phenol. The reaction involves mixing at a temperature of about 20° C. to about 200° C. four moles of alcohol or a phenol with one mole of phosphorus pentasulfide. Hydrogen sulfide is liberated in this reaction. The oxygen-containing analogs of these acids are conveniently prepared by treating the dithioic acid with water or steam which, in effect, replaces one or both of the sulfur atoms with oxygen.

In a preferred embodiment, the phosphorus-containing acid is the reaction product of the above polyalkenes and phosphorus sulfide. Useful phosphorus sulfide-containing sources include phosphorus pentasulfide, phosphorus sesquisulfide, phosphorus heptasulfide and the like.

The reaction of the polyalkene and the phosphorus sulfide generally may occur by simply mixing the two at a temperature above 80° C., preferably between 100° C. and 300° C. Generally, the products have a phosphorus content from about 0.05% to about 10%, preferably from about 0.1% to about 5%. The relative proportions of the phosphorus sulfide to the olefin polymer is generally from 0.1 part to 50 parts of the phosphorus sulfide per 100 parts of the olefin polymer.

The phosphorus-containing acids useful in the present invention are described in U.S. Pat. No. 3,232,883 issued to Le Suer. This reference is herein incorporated by reference for its disclosure to the phosphorus-containing acids and methods for preparing the same.

The phenols useful in making the overbased salts may be represented by the formula $(R)_f$—Ar—$(OH)_g$, wherein R and Ar are defined above; f and g are independently numbers of at least one, the sum of f and g being in the range of two up to the number of displaceable hydrogens on the aromatic nucleus or nuclei of Ar. Preferably, f and g are independently numbers in the range of 1 to about 4, more preferably 1 to about 2. R and f are preferably such that there is an average of at least about 8 aliphatic carbon atoms provided by the R groups for each phenol compound. Examples of phenols include octylphenol, nonylphenol, propylene tetramer substituted phenol, tri(butene)-substituted phenol, polybutenyl-substituted phenol and polyporpenyl-substituted phenol.

The metal compounds used in preparing the overbased materials are normally the basic salts of alkali, alkaline earth, transition, rare-earth metals or mixtures thereof. The anionic portion of the salt can be hydroxyl, oxide, carbonate, acetate, formate, hydrogen carbonate, nitrate, sulfite, hydrogen sulfite, halide, amide, sulfate, etc. Examples of metals include alkali, alkaline earth and transition metals such as sodium, potassium, lithium, calcium, magnesium, barium, yttrium, lead, aluminum, preferably calcium or yttrium, more preferably calcium. Preferred overbased materials are prepared from the metal oxides, hydroxides, and alcoholates such as the alkaline earth, i.e., calcium, oxides, hydroxides, and alcoholates including the calcium lower alkoxides having from 1 to about 7 carbon atoms.

The promoters, that is, the materials which facilitate the incorporation of the excess metal into the overbased material, are also quite diverse and well known in the art. A particularly comprehensive discussion of suitable promoters is found in U.S. Pat. Nos. 2,777,874, 2,695,910, 2,616,904, 3,384,586 and 3,492,231. These patents are incorporated by reference for their disclosure of promoters. In one embodiment, promotors include the alcoholic and phenolic promoters. The alcoholic promoters include the alkanols of one to about 12 carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols, and nonylphenols. Mixtures of various promotors are sometimes used.

Acidic materials, which are reacted with the mixture of acidic organic compound, promoter, metal compound and reactive medium, are also disclosed in the above cited patents, for example, U.S. Pat. No. 2,616,904. Included within the known group of useful acidic materials are liquid acids such as formic acid, acetic acid, nitric acid, boric acid, sulfuric acid, hydrochloric acid, hydrobromic acid, carbamic acid, substituted carbamic acids, etc. Acetic acid is a very useful acidic material although inorganic acidic compounds such as HCl, $SO_2$, $SO_3$, $CO_2$, $H_2S$, $N_2O_3$, etc., are ordinarily employed as the acidic materials. Preferred acidic materials are carbon dioxide and acetic acid, more preferably carbon dioxide.

The methods for preparing the overbased materials as well as an extremely diverse group of overbased materials are well known in the prior art and are disclosed, for example, in the following U.S. Pat. Nos.: 2,616,904; 2,616,905; 2,616,906; 3,242,080; 3,250,710; 3,256,186; 3,274,135; 3,492,231; and 4,230,586. These patents disclose processes, materials which can be overbased, suitable metal bases, promoters, and acidic materials, as well as a variety of specific overbased products useful in producing the disperse systems of this invention and are, accordingly, incorporated herein by reference for these disclosures.

The temperature at which the acidic material is contacted with the remainder of the reaction mass depends to a large measure upon the promoting agent used. With a phenolic promoter, the temperature usually ranges from about 80° C. to about 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter.

Depending on the reaction conditions and the choice of reactants in preparing the overbased materials, insoluble contaminants sometimes are present in the product. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Accordingly, it is preferred that any insoluble contaminants in the overbased materials be removed prior to converting the material in the colloidal disperse system. The removal of such contaminants is easily accomplished by conventional techniques such as filtration or centrifugation. In another embodiment, the contaminants may be removed by mixing the gelled overbased salts with an acidic material such as carbon dioxide or an acidic organic compound such as carboxylic or sulfonic acid. It should be understood, however, that the removal of these contaminants, while desirable for reasons just mentioned, is not an absolute essential aspect of the invention and useful products can be obtained when overbased materials containing insoluble contaminants are converted to the gelled overbased metal salts.

Broadly speaking, the gelled overbased metal salts of the invention are prepared by treating an overbased organic compound with a conversion agent, usually an active hydrogen containing compound. Gelled overbased metal salts have been referred to as Non-Newtonian colloidal disperse systems. Non-Newtonian colloidal disperse systems have the same meaning as gelled overbased metal salts. The gelling operation is accomplished through thorough mixing of the overbased salt and a conversion agent, i.e., homogenization. This treatment converts these overbased metal salts into the gelled overbased metal salt utilized in the compositions of the present invention.

Homogenization is achieved by vigorous agitation of the two components, preferably at the reflux temperature or a temperature slightly below the reflux temperature. The reflux temperature normally will depend upon the boiling point of the conversion agent. However, homogenization may be achieved within the range of about 25° C. to about 200° C. or slightly higher. Usually, the reaction temperature does not exceed about 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed.

The conversion agents include lower aliphatic carboxylic acids or anhydrides, water, aliphatic alcohols, cycloaliphatic alcohols, arylaliphatic alcohols, phenols, ketones, aldehydes, amines, including alkyl, cycloalkyl and aryl amines, boron acids, phosphorus acids, and carbon dioxide. Mixtures of two or more of these conversion agents are also useful. Particularly useful conversion agents are discussed below.

The lower aliphatic carboxylic acids are those containing less than about 8 carbon atoms in the molecule. Examples of this class of acids are formic acid, acetic acid, propionic acid, butyric acid, preferably formic acid, acetic acid, or propionic acid, more preferably acetic acid.

Useful alcohols include aliphatic, cycloaliphatic, and arylaliphatic mono- and polyhydroxy alcohols. Alcohols having less than about 12 carbons are especially useful while the lower alkanols, i.e., alkanols having less than about 8 carbon atoms are preferred for reasons of economy and effectiveness in the process. Generally, the alcohols include methanol, ethanol, isopropanol, n-propanol, isobutanol, tertiary butanol, and amyl alcohol, preferably methanol and isopropyl alcohol.

The use of a mixture of water and one or more of the alcohols is especially effective for converting the overbased material to gelled overbased material. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol, preferably methanol and isopropyl alcohol, is present in the alcohol component of these water-alkanol mixtures. Water-alkanol mixtures wherein the alcoholic portion is one or more lower alkanols are especially suitable.

The conversion agents or a proportion thereof may be retained in the colloidal disperse system. The conversion agents are however, not essential components of these disperse systems. From the standpoint of uniform results, it is usually desirable that as little of the conversion agents as possible be retained in the disperse systems. Since these conversion agents do not react with the overbased material in such a manner as to become permanently bounded, it is normally a simple matter to remove a major proportion of the conversion agents and, generally, substantially all of the conversion agents. Since the liquid conversion agents are generally more volatile than the remaining components of the disperse system, they are readily removable by conventional devolatilization techniques, e.g., heating, heating at reduced pressures, and the like.

The overbased metal salts, gelled overbased salts and methods for preparing the same are disclosed in U.S. Pat. Nos. 3,384,586 and 3,492,231. These patents are incorporated by reference for their disclosure to these salts and methods of making the same.

The above additives may be post-treated with one or more post-treating reagents selected from the group consisting of boron trioxide, boron anhydrides, boron halides, boron acids, boron amides, esters of boric acids, carbon disulfide, hydrogen sulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiphosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds with phenols, and sulfur with phenols.

The following U.S. Patents are expressly incorporated herein by reference for their disclosure of post-treating processes and post-treating reagents: U.S. Pat. Nos. 3,087,936; 3,254,025; 3,256,185; 3,278,550; 3,282,955; 3,284,410; 3,338,832; 3,533,945; 3,639,242; 3,708,522; 3,859,318; 3,865,813; etc. U.K. Patent Nos. 1,085,903 and 1,162,436 also describe such processes.

In one embodiment, the additives are post-treated with at least one boron compound. The reaction of the additive with the boron compounds can be effected simply by mixing the reactants at the desired temperature. Ordinarily it is preferably between about 50° C. and about 250° C. In some instances it may be 25° C. or even lower. The upper limit of the temperature is the decomposition point of the particular reaction mixture and/or product.

The amount of boron compound reacted with one of additives generally is sufficient to provide from about 0.1 to about 10 atomic proportions of boron for each equivalent of the additive, such as the atomic proportion of nitrogen or hydroxyl group of the additive. The preferred amounts of reactants are such as to provide from about 0.5 to about 2 atomic proportions of boron for each equivalent of additive. To illustrate, the amount of a boron compound having one boron atom per molecule to be used with one mole of an amine additive having five nitrogen atoms per molecule is within the range from about 0.1 mole, preferably about 0.5 mole, to about 50 moles, preferably to about 10 moles.

Borated overbased compositions, and methods of preparing borated overbased compositions are found in U.S. Pat. No. 4,744,922 issued to Fischer et al; U.S. Pat. No. 4,792,410 issued to Schwind et al and PCT Publication WO88/03144. The disclosure relating to the above are hereby incorporated by reference.

Small amounts of the sintering aids generally are sufficient to provide the desired improvement in strength, thermal conductivity and/or density of the sintered shapes, thus, amounts of from about 0.05%, preferably about 0.1% to about 10%, preferably to about 5%, by weight of the sintering aid based on the weight of the inorganic powder, are sufficient.

LIQUID DISPERSING MEDIUM

The compositions of the present invention also may contain, and generally do contain a liquid dispersing medium. It is an important aspect of this invention, however, that mixtures, dispersions and/or slurries prepared with the compositions of the present invention are homogeneous, substantially free of agglomerated inorganic powder particles, and stable. It also is preferred that the liquid dispersing medium be volatile under the conditions of drying or binder burnout prior to the early stages of sintering so that the medium does not interfere with the preparation of compacted inorganic shapes characterized by desirable densities and the absence of cracks and other defects. The medium can have components characterized by relatively low boiling points such as, for example, in the range of about 25° C. to about 120° C. to facilitate subsequent removal of a portion or substantially all of the medium from the compositions of the invention. Alternatively, the medium may contain components that have higher boiling points to protect against removal from such compositions upon standing or initial heating. There is no criticality in an upper boiling point limitation on these liquids except, as noted above, the liquids should be removable prior to the initial sintering process.

The liquid dispersing medium may be oxygenated or hydrocarbon in nature. Oxygenated solvents include alcohols, esters, ketones and water as well as ethoxylated versions of the same. Combinations of these materials are also useful. Alcohols include alcohols having less than 12 carbon atoms, especially lower alkanols, such as methanol, ethanol, propanol and butanol. Esters include carboxylic esters prepared from carboxylic acids having from 2 to 20 carbon atoms and alcohols having from 1 to about 22 carbon atoms. Examples of carboxylic esters include methylacetate, ethylacetate, propylacetate. Ketones include methylethyl ketone, methylisobutyl ketone as well as keto alcohols such as diacetone alcohol, hydroxy acetone, hydroxymethylpentanone and the like. Tetrahydrofuran may also be used as a liquid dispersing medium.

The oxygenated dispersing media include alkoxy alcohols which are characterized as having ether linkages and may be prepared by using alkylene oxides having from 2 to about 10 carbons atoms, such as ethylene oxide, propylene oxide and the like. Alkoxy alcohols are available commercially under trade names such as Cellosolve TM, Propasol TM, Carbitol ® solvents available from Union Carbide. Examples of these materials include ethylene glycol monoethyl, monopropyl, monobutyl or monohexyl ethers, propylene glycol monomethyl, monoethyl, monopropyl, monobutyl and monohexyl ethers and the like. Alkoxy alcohols also include polyoxyalkylene glycols such as Carbowax ® PEG 300, 600, 1000 and 1450 available from Union Carbide Corporation. Polyoxypropylene glycols are also useful, such as Nyax 425 and Nyax 1025 available from Union Carbide and PPG-1200 and PPG-2000 available from Dow Chemical. Polyoxyalkylene polyols such as "TRITON ®" available from Rohm & Haas Company, "CARBOWAX ®" and "TERGITOL ®" available from Union Carbide, "ALFONIC ®" available from Conoco Chemical Company and "NEODOL ®" available from Shell Chemical are useful as liquid dispersing media.

Alkyl, cycloalkyl and aryl hydrocarbons, as well as petroleum fractions may also be used as liquid media in this invention. Included within these types are benzene and alkylated benzenes, cycloalkanes and alkylated cycloalkanes, cycloalkenes and alkylated cycloalkenes such as found in the naphthene-based petroleum fraction, and the alkanes such as found in the paraffin-based petroleum fractions. Petroleum ether, naphthas, mineral oils, Stoddard Solvent, toluene, xylene, etc., and mixtures thereof are examples of economical sources of suitable liquid disperse medium.

In one embodiment, the liquid dispersing medium is polar or of mixed polarity, i.e. a mixture of a nonpolar medium and a polar medium. In this embodiment, the reaction product (B) is prepared from a hydrocarbyl-substituted carboxylic acylating agent, wherein the hydrocarbyl group contains from about 8 to about 50 carbon atoms, as are described above. These reaction products have improved dispersant effectiveness and compatibility in polar and mixed polar media.

The amount of liquid disperse medium utilized in the compositions of the present invention may vary over a wide range although it is generally desirable to prepare compositions containing a maximum amount of the inorganic powder and a minimum amount of the disperse medium. The amount of liquid disperse medium utilized in any particular combination can be readily determined by one skilled in the art will depend upon the nature of the inorganic powder, the type and amount of dispersant, and any other components present in the composition. The amount of liquid dispersed medium present is usually from as low as 1–2%, generally about 5%, preferably about 10%, more preferably about 15%, to about 40%, preferably about 35%, more preferably about 30% by weight based on the amount of inorganic powder (A).

OTHER ADDITIVES

Other materials may be added to the compositions of the present invention. For example, plasticizers may be added to the compositions to provide more workable compositions. Examples of plasticizers normally utilized in inorganic formulations include dioctyl phthalate, dibutyl phthalate, benzyl butyl phthalate and phosphate esters.

PREPARATION

The preparation of inorganic shapes utilizing the methods of the present invention generally involves mixing the inorganic powder with the reaction product (B). The mixture can be prepared either in the absence or presence of a volatile liquid dispersing medium. Any of the optional components described above can be mixed with the inorganic powder and the polymer at this stage. The mixed composition then is blended in, for example, a ball-mill where additional components can be added and blended into the mixture as desired. The blended mixture can then be shaped in a mold, a still water press, or sheet mold. Alternatively, the blended mixture can be extrusion- or ejection-molded to form a green body, or the mixture can be prepared by casting the mixture on a tape. The green body may also be prepared by spray-drying, rotary evaporation, etc. Following the formation of the mixture into the desired shape, the shaped mass is subjected to elevated temperature treatment (sintering).

The heat treatment is a high-temperature treatment at which time the inorganic powders are sintered resulting in the formation of a shape having the desired properties including suitable densities. For powder metallurgy, the sintering generally occurs between about 260° C. to about 2100° C., typically to about 1000° C. For ceramic processes, the sintering generally occurs from about 600° C., preferably about 700° C. up to about 1700° C. When the inorganic powders (A) are oxide powders, baking and sintering can be effected in the presence of air or oxygen. However, when the inorganic powders are non-oxide powders such as the nitrides and carbides, sintering is effected in a nonoxidizing atmosphere such as an atmosphere of hydrogen, argon or nitrogen gas.

In one embodiment, the shaped mass is heated to a temperature which is sufficient to remove organic materials from the green shape. That is, the shape is heated to a temperature which is sufficient to vaporize and/or decompose organic materials from the shape. This heating step, often referred to as drying or binder burn-out, takes place at moderately elevated temperatures, and is generally completed at a temperature below 700° C.

Removal of organic materials is generally carried out under conditions which provide for the removal of the organic materials before the inorganic powders are subjected to sintering.

In another embodiment, the organic materials, including binder, may be removed by solvent extraction. The solvent extraction may also be super critical solvent extraction, i.e., at high temperature and pressure. Generally, the green body is heated to above the flow point of the binder and exposed to solvent vapor. The green body may also be submerged in a solvent bath. In one embodiment, the green body is exposed to solvent extraction and then undergoes drying (burn out) to remove the organic materials. The solvent useful for extraction include liquid dispersing media described above. Alcohols, alkanes, such as hexane, pentane, octane, etc., and aromatic fractions including toluene and xylene are particularly useful.

U.S. Pat. Nos. 4,961,913 and 4,197,118 describe solvent extraction processes for ceramics and are hereby incorporated by reference for that disclosure.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method of preparing sintered shapes, comprising the steps of:
   (1) forming a green body from a mixture comprising (A) a major amount of at least one inorganic powder with (B) at least one reaction product of an amine other than an alkanolamine with a hydrocarbyl-substituted carboxylic acylating agent or alkylalkyleneglycolacetic acylating agent; provided the reaction product is other than an alkylene oxide treated fatty monocarboxylic amide and provided that when the hydrocarbyl-substituted carboxylic acylating agent is a nonaromatic acylating agent, then the hydrocarbyl group is other than hydrocarbyl groups having an average of about 55 to about 110 carbon atoms; and
   (2) sintering the body.

2. The method of claim 1, wherein the hydrocarbyl group contains from about 8 to about 50 carbon atoms.

3. The method of claim 1, wherein the hydrocarbyl group is derived from an olefin, olefin oligomer, olefin polymer or mixture thereof.

4. The method of claim 1, wherein the hydrocarbyl group is derived from one or more olefin selected from the group consisting of dodecene, tetradecene, pentadecene, hexadecene, heptadecene, octadecene and mixtures thereof.

5. The method of claim 1, wherein the hydrocarbyl group is derived from oligomers or polymers of ethylene, propylene or butylene.

6. The method of claim 1, wherein the hydrocarbyl group is a hexadecenyl group or tetrapropenyl group.

7. The method of claim 1, wherein the hydrocarbyl group is derived from a polyalkene having a number average molecular weight of about 1600 to about 3000.

8. The method of claim 1, wherein the acylating agent is a hydrocarbyl-substituted succinic acylating agent having a hydrocarbyl group derived from a polyalkene having a number average molecular weight from about 1600 to about 5000, a $\overline{M}w/\overline{M}n$ ratio of 1.4 to 5 and contains an average of 1.3 to 4 succinic groups per equivalent of hydrocarbyl group.

9. The method of claim 1, wherein the amine is a polyamine.

10. The method of claim 1, wherein the amine is a polyalkylene polyamine.

11. The method of claim 1, wherein the reaction product (B) is further reacted with a boron compound.

12. The method of claim 1, wherein the powder (A) is a ceramic powder.

13. The method of claim 12, wherein the ceramic powder is alumina, aluminum nitride, silicon carbide, barium ferrite or copper oxide.

14. The method of claim 1, wherein the inorganic powder (A) is a metal or metal alloy powder.

15. The method of claim 1, wherein (B) the reaction product is present in an amount from about 0.05% to about 30% by weight based on the inorganic powder.

16. The method of claim 1, wherein the mixture further comprises a sintering amount of an overbased or gelled overbased metal salt.

17. The method of claim 1, wherein step (2) further comprises removing volatile materials from the shape prior to sintering.

18. The method of claim 1, wherein the mixture further comprises water.

19. A method of preparing sintered shapes, comprising the steps of:
    (1) forming a green body from a mixture comprising (A) a major amount of at least one inorganic powder with (B) at least one reaction product of an amine other than an alkanolamine and an aromatic carboxylic acylating agent; and
    (2) sintering the body.

20. The method of claim 19, wherein the aromatic carboxylic acylating agent is a salicylic, phthalic, or terphthalic acylating agent.

21. The method of claim 19, wherein the aromatic carboxylic acylating agent is substituted with a hydrocarbyl group derived from a polyalkene having a number average molecular weight of about 700 to about 5000.

22. The method of claim 19, wherein the aromatic carboxylic acylating agent is hydrocarbyl-substituted salicylic acylating agent with a hydrocarbyl group having from 8 to about 500 carbon atoms.

23. The method of claim 19, wherein the reaction product (B) is further reacted with a boron compound.

24. The method of claim 19, wherein the amine is a polyalkylenepolyamine.

25. The method of claim 19, wherein the mixture further comprises an overbased or gelled overbased metal salt.

26. The method of claim 25, wherein the salt is an alkaline earth metal sulfonate or carboxylate.

27. The method of claim 25, wherein the metal salt is a calcium or magnesium sulfonate.

28. The method of claim 19, wherein step (2) further comprises removing volatile materials form the shape prior to sintering.

29. A method for preparing sintered shapes, comprising the steps of:
    (1) forming a green body from a mixture comprising (A) a major amount of at least one inorganic powder, and (B) from about 0.05% to about 30% by weight of at least one reaction product of a polyamine other than an alkanolamine and a hydrocarbyl-substituted carboxylic acylating agent provided that the hydrocarbyl group is other than hydrocarbyl groups having an average of about 55 to about 110 carbon atoms; and (2) sintering the body.

30. The method of claim 29, wherein the hydrocarbyl group contains an average from about 12 to about 30 carbon atoms.

31. The method of claim 29, wherein the hydrocarbyl group is a dodecenyl, tetradecenyl, hexadecenyl, octadecenyl, propylene oligomer derived, ethylene oligomer derived or ethylene polymer derived group.

32. The method of claim 29, wherein the hydrocarbyl carboxylic acylating agent is a tetrapropenyl-substituted carboxylic acylating agent or a hexadecenyl-substituted carboxylic acylating agent.

33. The method of claim 29, wherein the acylating agent is a hydrocarbyl-substituted succinic acylating agent having a hydrocarbyl group derived from a polyalkene having a number average molecular weight from about 1600 to about 5000, a $\overline{M}w/\overline{M}n$ ratio of 1.4 to 5 and an average of 1.3 to 4 succinic groups per equivalent of hydrocarbyl group.

34. The method of claim 29, wherein the amine is a polyalkylene polyamine.

35. The method of claim 29, wherein the powder (A) is a ceramic powder.

36. The method of claim 35, wherein the ceramic powder is alumina, aluminum nitride, silicon carbide, barium ferrite or copper oxide.

37. The method of claim 29, wherein the inorganic powder (A) is a metal or metal alloy powder.

38. The method of claim 29, wherein step (2) further comprises removing volatile material from the shape prior to sintering.

39. An article, comprising: a green body, comprising: (A) a major amount of at least one inorganic powder with (B) at least one reaction product of an amine other than an alkanolamine with a hydrocarbyl-substituted carboxylic acylating agent provided the reaction product is other than an alkylene oxide treated fatty monocarboxylic amide and provided that when the acylating agent is a nonaromatic acylating agent, then the hydrocarbyl group is other than hydrocarbyl groups having an average of about 55 to about 110 carbon atoms.

40. A sintered shape prepared by the method of claim 1.

* * * * *